(12) United States Patent
Prasad et al.

(10) Patent No.: US 11,973,657 B2
(45) Date of Patent: Apr. 30, 2024

(54) ENTERPRISE MANAGEMENT SYSTEM USING ARTIFICIAL INTELLIGENCE AND MACHINE LEARNING FOR TECHNOLOGY ANALYSIS AND INTEGRATION

(71) Applicant: Accenture Global Solutions Limited, Dublin (IE)

(72) Inventors: Rajendra Tanniru Prasad, Basking Ridge, NJ (US); Bhaskar Ghosh, Bengaluru (IN); Aditi Kulkarni, Bengaluru (IN); Koushik M. Vijayaraghavan, Chennai (IN); Purnima Jagannathan, Chennai (IN); Parul Jagtap, Delhi (IN); Sangeetha Jayaram, Mumbai (IN); Badrinath Parameswar, Chennai (IN); Manas Mishra, Kanpur (IN); Jeffson Felix Dsouza, Bangalore (IN); Gaurav Goenka, New Delhi (IN); Gaurav Sood, Mohali (IN); Pradeep Senapati, Bangalore (IN); Vaijayanthi Ramaswamy, Chennai (IN); Ranjith Tharayil, Bangalore (IN); Mahesh Zurale, Pune (IN); Ramanathan Venkataraman, Shorthills, NJ (US)

(73) Assignee: Accenture Global Solutions Limited, Dublin (IE)

(*) Notice: Subject to any disclaimer, the term of this patent is extended or adjusted under 35 U.S.C. 154(b) by 823 days.

(21) Appl. No.: 17/076,412

(22) Filed: Oct. 21, 2020

(65) Prior Publication Data
US 2022/0124000 A1    Apr. 21, 2022

(51) Int. Cl.
*H04L 41/14*    (2022.01)
*G06F 17/16*    (2006.01)
(Continued)

(52) U.S. Cl.
CPC .......... *H04L 41/14* (2013.01); *G06F 17/16* (2013.01); *G06F 18/22* (2023.01);
(Continued)

(58) Field of Classification Search
CPC ....... H04L 41/14; H04L 67/535; G06F 17/16; G06F 18/22; G06F 18/24147;
(Continued)

(56) References Cited

U.S. PATENT DOCUMENTS

| 8,682,710 B2* | 3/2014 | Dennard ............... G06Q 10/10 705/7.29 |
| 2017/0199846 A1* | 7/2017 | Lehmann ............... G06F 17/16 |
| 2020/0125891 A1 | 4/2020 | Andrabi et al. |

FOREIGN PATENT DOCUMENTS

KR    102137230 B1    7/2020

OTHER PUBLICATIONS

Bhardwaj, Dr. Garima et al., "An Empirical Study of Artificial Intelligence and its Impact on Human Resource Functions", 2020, International Conference on Computation, Automation and Knowledge Management (ICCAKM), Amity University, IEEE. (Year: 2020).*

(Continued)

*Primary Examiner* — Cedric Johnson
(74) *Attorney, Agent, or Firm* — Harrity & Harrity, LLP (57) ABSTRACT

A system may receive enterprise information associated with a client enterprise. The system may select, using an industry analysis model, a set of queries associated with obtaining status information that is associated with a technology profile of the client enterprise. The system may generate client data that is associated with the enterprise information and the status information. The system may convert, using a matrix factorization technique, the client data associated with the client enterprise to a client matrix. The system may (Continued)

convert, using the matrix factorization technique, reference data associated with reference enterprises to a reference matrix. The system may determine, based on a comparison of the client matrix and the reference matrix, a set of scores associated with technology metrics of the technology profile. The system may perform an action associated with the client enterprise based on the set of scores.

20 Claims, 6 Drawing Sheets

(51) Int. Cl.
*G06F 18/22* (2023.01)
*G06F 18/2413* (2023.01)
*G06N 5/04* (2023.01)
*H04L 67/50* (2022.01)

(52) U.S. Cl.
CPC ......... *G06F 18/24147* (2023.01); *G06N 5/04* (2013.01); *H04L 67/535* (2022.05)

(58) Field of Classification Search
CPC ........ G06F 16/903; G06N 5/04; G06N 20/00; G06N 67/535; G06Q 30/0201; G06Q 10/06; G06Q 10/06393
USPC .......................................................... 703/2
See application file for complete search history.

(56) References Cited

OTHER PUBLICATIONS

Tambe, Prasanna et al., "Artificial Intelligence in Human Resources Management: Challenges and a Path Forward", Nov. 30, 2018. (Year: 2018).*

Jia et al., "A Conceptual Artificial Intelligence Application Framework in Human Resource Management," In Proceedings of The 18th International Conference on Electronic Business (ICEB), Dec. 2-6, 2018, pp. 106-114.

* cited by examiner

ENTERPRISE MANAGEMENT SYSTEM USING ARTIFICIAL INTELLIGENCE AND MACHINE LEARNING FOR TECHNOLOGY ANALYSIS AND INTEGRATION

BACKGROUND

Enterprises may use various types of technologies to manage the enterprise, provide a service, perform an operation, or the like. For example, certain technologies may include various types of automated systems, software systems, computing technologies, network and communication technologies, etc. Enterprises designate certain individuals and/or departments (e.g., information technology (IT) departments, human resources (HR) departments, and/or the like) to manage technology usage within the enterprise and/or by certain representatives of the enterprise, depending on roles of the individuals or needs of the enterprise.

SUMMARY

In some implementations, a method includes obtaining an industry analysis model that is configured to analyze enterprises associated with a particular industry; receiving enterprise information associated with a client enterprise; selecting, using the industry analysis model, a set of queries associated with obtaining status information that is associated with a technology profile of the client enterprise; providing the set of queries to a client device to obtain the status information; receiving, from the client device, the status information; generating client data that is associated with the enterprise information and the status information; converting, using a matrix factorization technique, the client data associated with the client enterprise to a client matrix; selecting, based on the client data, reference data associated with reference technology profiles of reference enterprises that are associated with the particular industry; converting, using the matrix factorization technique, the reference data to a reference matrix; determining, based on a comparison of the client matrix and the reference matrix, a set of scores associated with technology metrics of the technology profile; and performing an action associated with the client enterprise based on the set of scores.

In some implementations, a device includes one or more memories; and one or more processors, communicatively coupled to the one or more memories, configured to: receive enterprise information associated with a client enterprise; determine, from the enterprise information, enterprise characteristics associated with the client enterprise; select, based on the enterprise characteristics, a set of queries associated with obtaining status information that is associated with a technology profile of the client enterprise; provide the set of queries to a client device to obtain the status information; receive, from the client device, the status information; generate client data that is associated with the enterprise characteristics and technology metrics identified in the status information; select, based on the client data, reference data associated with reference technology profiles of reference enterprises that are associated with the particular industry; generate, from the client data and using a matrix factorization technique, a client matrix that is based on the technology metrics and the enterprise characteristics; generate, from the reference data and using the matrix factorization technique, a reference matrix that is based on corresponding technology metrics and corresponding enterprise characteristics of the reference enterprises; determine, based on a comparison of the client matrix and the reference matrix, a recommendation associated with usage of a particular technology of the technology profile; and perform an action associated with the recommendation and the client enterprise.

In some implementations, a non-transitory computer-readable medium storing a set of instructions includes one or more instructions that, when executed by one or more processors of a device, cause the device to: collect reference information associated with a plurality of reference enterprises that are associated with a particular industry; determine, from the reference information, technology metrics associated with the particular industry; generate, based on the technology metrics, a set of queries associated with obtaining status information for technology metrics of a client enterprise; provide, to a client device associated with the client enterprise, the set of queries to obtain the status information; receive, from the client device, the status information and enterprise characteristics associated with the client device; generate client data that is associated with the enterprise characteristics and the status information; determine, based on the enterprise characteristics, a set of reference enterprises, from the plurality of reference enterprises, that are similar to the client enterprise; obtain reference data associated with the set of reference enterprises; convert, using a matrix factorization, the client data to a client matrix and the reference data to a reference matrix; determine, based on a comparison of the client matrix and the reference matrix, a set of scores associated with technology metrics of a technology profile; and perform an action associated with the client enterprise based on the set of scores.

DETAILED DESCRIPTION

The following detailed description of example implementations refers to the accompanying drawings. The same reference numbers in different drawings may identify the same or similar elements.

In many instances, an enterprise is tasked with integrating one or more technologies for various reasons. For example, an enterprise may choose to go paperless to reduce waste, costs associated with paper, mailing paper, among other reasons. As another example, an enterprise may choose to utilize a cloud-based computing platform for day-to-day computing by representatives to have a centralized platform that can be easier to secure, monitor, and/or share information (e.g., documents and/or files). While certain technologies continue to individually advance (e.g., to become more efficient, more flexible, more accessible, or the like), the variety of technologies continues to increase. More and more technology-based options are becoming available to enterprises and/or industries.

Accordingly, an enterprise is tasked with deciding whether a certain technology should be adopted and/or integrated with the enterprise in one form or another. Currently, many of these decisions are based on speculation that is informed from an analysis of the technology (e.g., how the technology operates, what service the technology provides, or the like), a cost/benefit analysis of adopting the technology, a market analysis of the technology, or the like. However, in many cases, such analyses are performed on information that cannot provide an accurate assessment of whether the technology should be adopted by an enterprise. For example, such information and/or data may be incomplete (e.g., due to the wide variety of available information), inaccurate (e.g., due to the available information being outdated), and/or irrelevant (e.g., reviews or usage information associated with users or enterprises that are not associated with or similar to the enterprise).

Some implementations described herein provide an enterprise management system that is configured to identify, determine, and/or facilitate integration of a technology for an enterprise based on characteristics of the enterprise, a technology profile of the enterprise, and/or technology information associated with an industry of the enterprise. The enterprise management system may collect and/or maintain a variety of technological information associated with a variety of industries within a reference data structure to provide a centralized location of complete, accurate, and relevant information. As described herein, the enterprise management system may utilize one or more machine learning models to analyze and/or compare the above, select the most relevant information from a reference data structure, determine an optimal integration of a certain technology, and facilitate the integration of the technology.

As a result, the enterprise management system may conserve computing resources (e.g., processing resources, memory resources, and/or the like) and/or communication resources (e.g., wireless or wired resources of a network) that might otherwise be consumed by accessing, obtaining, and/or analyzing incomplete sets of information, inaccurate sets of information, and/or irrelevant sets of information. Furthermore, the enterprise management system may allow for certain optimal technologies (e.g., according to one or more models described herein) to be integrated within an enterprise that enable the enterprise to conserve certain resources (e.g., computing resources, hardware resources, network resources, labor, and/or the like) that might otherwise be wasted without integrating such optimal technologies.

In this way, the enterprise management system may facilitate determination of a recommendation and/or integration of a technology. Moreover, the enterprise management system may enable (e.g., based on information and/or resources associated with a particular technology) a technology to be integrated and/or utilized by an enterprise, which prevents a waste of computing resources (e.g., processing resources, memory resources, power resources, and/or the like) associated with computing devices that would otherwise be used by personnel to integrate the technology.

Figure 1A:
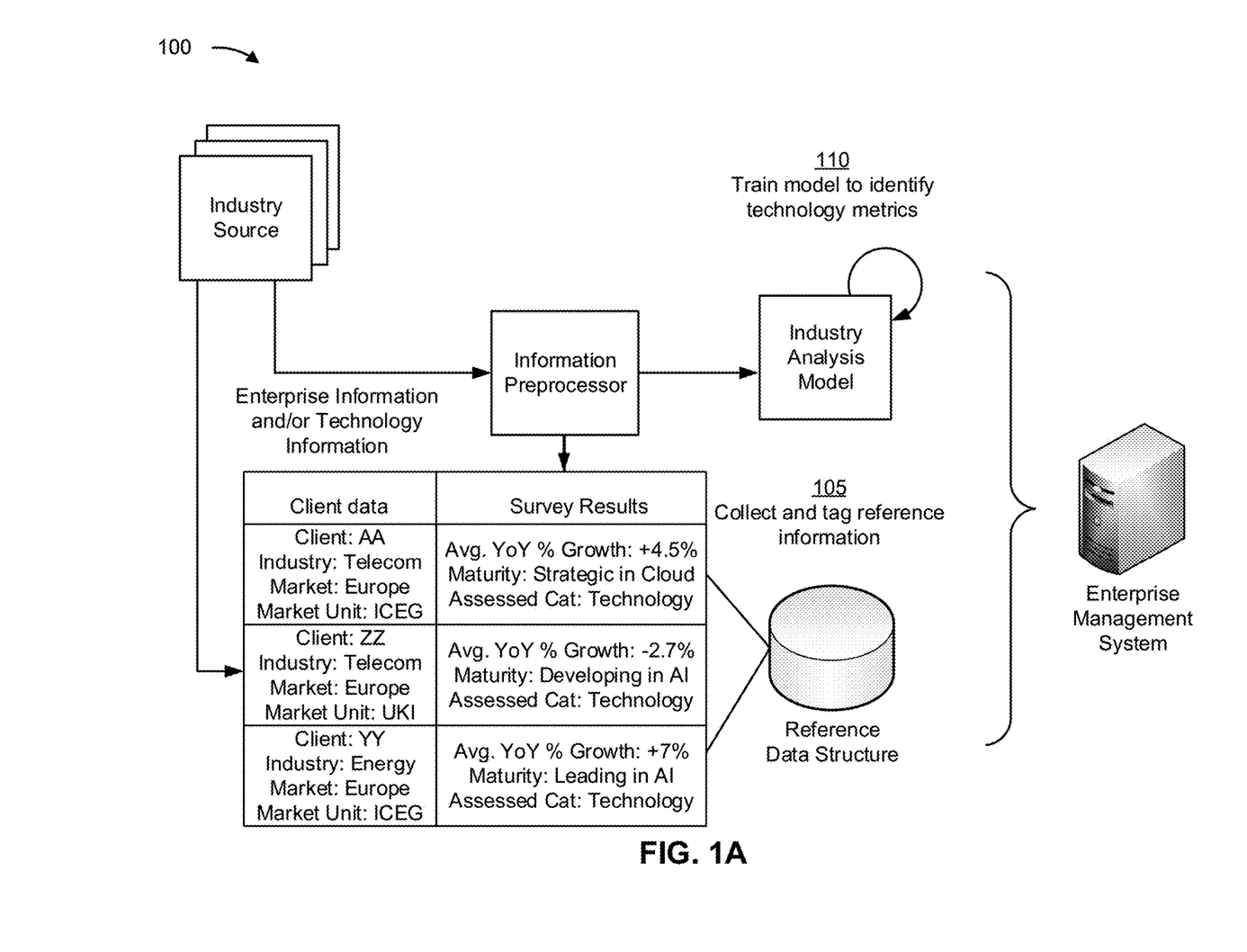
FIGS. 1A-1C are diagrams of an example implementation described herein.
Figure 1B:
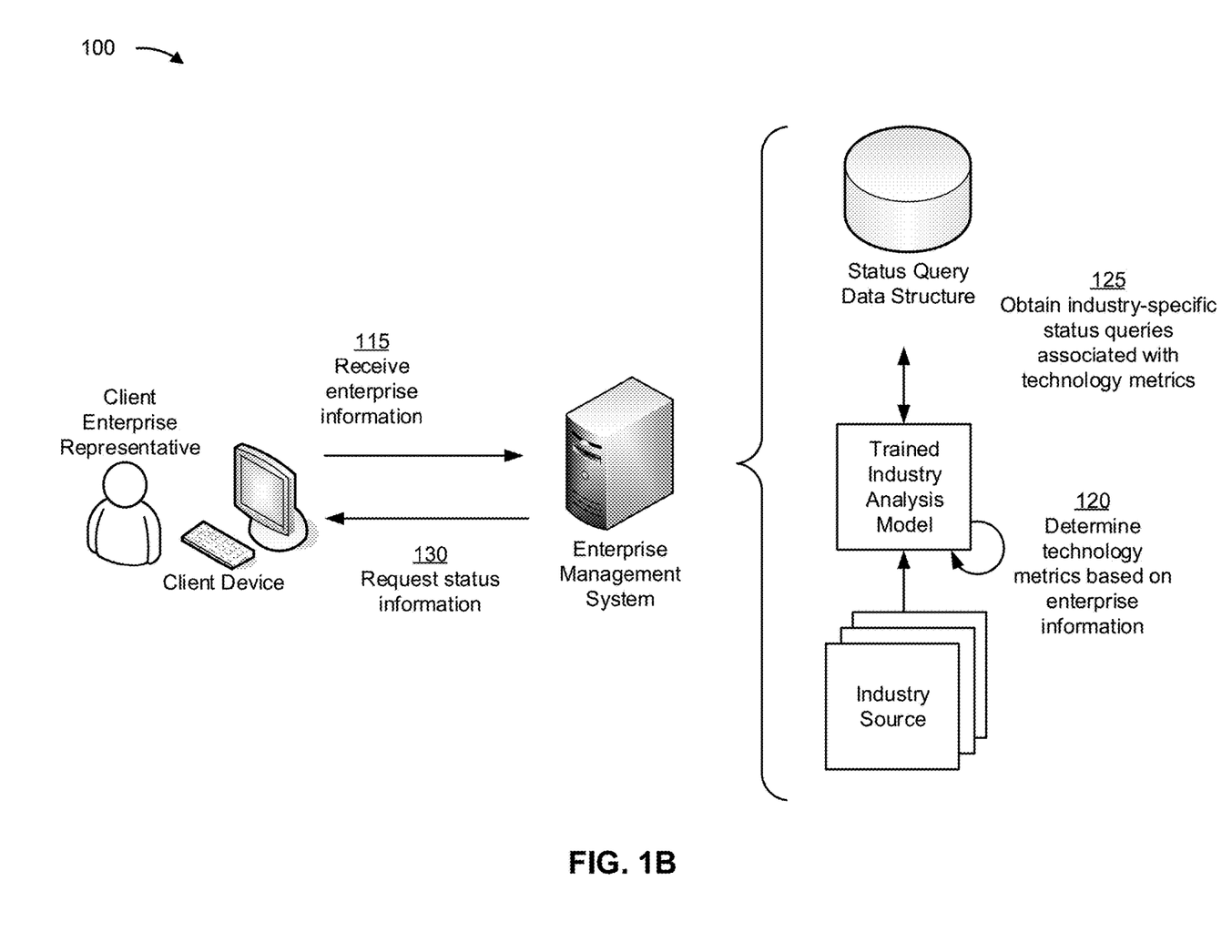
Figure 1C:
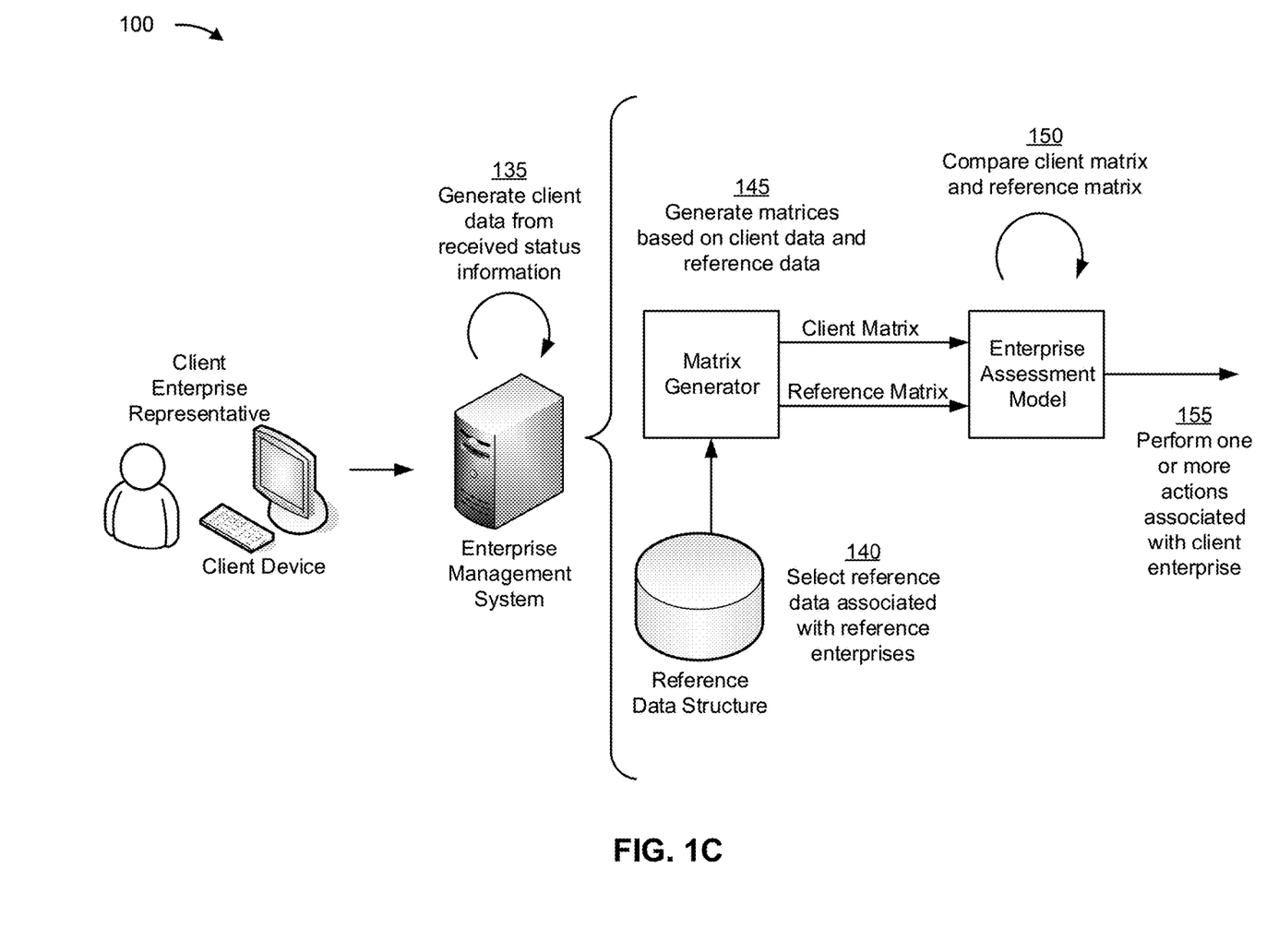

FIGS. 1A-1C are diagrams of an example 100 associated with analyzing and integrating technology for an enterprise. As shown in FIGS. 1A-1C, example 100 includes one or more industry sources, an enterprise management system, and a client device associated with a client enterprise representative (e.g., a user of the enterprise management system). As shown in example 100, the enterprise management system includes a reference data structure, an information preprocessor, an industry analysis model, a status query data structure, a matrix generator, and an enterprise assessment model.

As shown in FIG. 1A, and by reference number 105, the enterprise management system collects and tags reference information. For example, the enterprise management system may receive the reference information from one or more of the industry sources. An industry source may include a platform (e.g., an online platform, a media platform, an application platform, an open source platform, and/or the like) that provides enterprise information and/or technology information to the enterprise management system (e.g., via user inputs, data uploads, data transmissions, and/or the like). In some implementations, an industry source may include a particular type of information source, such as a news source (e.g., a financial news source, a market news source, an industry-specific news source, and/or the like), a data analytics platform, a crowd-sourced platform (e.g., a survey platform, a review platform, and/or the like), a research platform, and/or the like. Additionally, or alternatively, an industry source may include one or more devices associated with a particular individual or organization that is communicatively coupled to the enterprise management system (e.g., via a network, such as a communication network, the Internet, and/or the like).

In some implementations, the enterprise management system may be configured to collect the reference information (e.g., via a web crawler, robotic process automation (RPA), an Internet of Things (IoT) system, among other examples) from such platforms, devices, and/or other similar systems. In such a case, the enterprise management system may collect the reference information periodically, according to a schedule, and/or according to a particular event (e.g., an ad hoc user request, an industry-specific event, an enterprise-specific event, and/or the like).

The enterprise management system may utilize the information preprocessor to receive the reference information, process the reference information (e.g., analyze, parse, sort and/or the like), and convert the reference information to a uniform format for storage in the reference data structure. The information preprocessor may use any suitable technique to receive, process, and/or analyze the reference information. For example, the information preprocessor may utilize an application programming interface (API), optical character recognition (OCR), natural language processing (NLP), computer vision techniques, and/or the like to process received reference information for storage in the reference data structure.

Accordingly, as shown, the reference information from the industry sources is stored in the reference data structure. The reference information may include enterprise information that identifies one or more enterprise characteristics of reference enterprises and/or technology information that identifies one or more technology profiles of the reference enterprises. More specifically, such enterprise information may include revenue information associated with the reference enterprise, growth information associated with the reference enterprise, one or more industries in which the reference enterprise provides a service, a market of the reference enterprise, a location of the reference enterprise, and/or the like. Technology information may include types of technology used by the enterprise and/or a level of usage of the technology. The level of usage may be based on a particular scale, such as a number range, a maturity level (e.g., low usage, developing usage, emerging usage, strategic usage, and/or leading usage), an industry-based level (e.g., leading enterprises in the technology, intermediate enterprises in the technology, and/or lagging enterprises in the technology).

As described herein, the information preprocessor may sort the enterprise information and/or the technology information for a reference enterprise into an entry of the reference data structure that is created, associated with, and/or designated for the reference enterprise. The information preprocessor may tag the entry with one or more identifiers and/or flags that are associated with example enterprise characteristics, technology profiles, and/or the like. In this way, the reference data structure may be searchable (e.g., via an index, a graph, and/or the like) to permit the enterprise management system to identify entries associated with certain enterprise characteristics, technology types, levels of technology usage, and/or the like.

Accordingly, as an example, the information preprocessor may collect and/or receive historical surveys, historical articles, historical research documents, and/or the like that are associated with one or more enterprises of one or more industries. The information preprocessor may process the historical surveys, historical articles, historical research documents, to extract and/or identify enterprise characteristics and/or technology profiles associated with the enterprises, and store reference data in the reference data structure that is associated with the extracted and/or identified enterprise characteristics and/or technology profiles.

In some implementations, the reference data structure may store hundreds, thousands, millions, or more entries of reference information that are associated with hundreds, thousands, millions, or more reference enterprises that may be involved in different industries and/or that may be associated with different types of enterprise characteristics and/or technology profiles Additionally, or alternatively, the enterprise management system may process hundreds, thousands, millions, or more sets of reference information to generate entries for storage of the processed reference information in the reference data structure.

In this way, the enterprise management system may collect and tag reference information to permit the enterprise management system to use the reference information to determine a technology-based recommendation for an enterprise and/or facilitate integration of a particular technology for the enterprise, as described herein.

As further shown in FIG. 1A, and by reference number 110, the enterprise management system trains an industry analysis model to identify technology metrics. The enterprise management system may train the industry analysis model periodically, according to a schedule, and/or based on a particular event (e.g., new reference information or a new entry being added to the reference data structure).

The industry analysis model may include and/or be associated with one or more artificial intelligence techniques (e.g., machine learning and/or deep learning, among other examples) to identify the technology metrics. The technology metrics may correspond to technology-based key performance indicators (KPIs) that negatively and/or positively affect a performance of a particular enterprise. In some implementations, the technology metrics may be industry-specific. For example, a technology metric (or KPI) for a first industry may be different from a technology metric for a second industry.

As described herein, the industry analysis model may be trained (e.g., according to a neural network technique, a linear regression technique, and/or the like) using historical data that is associated with identifying one or more technology metrics associated with an industry and/or enterprise based on historical values for one or more industry parameters. Such industry parameters may include KPIs of the industry, such as a revenue metric, a growth metric, a size metric (e.g., representative of the enterprise size based on a quantity of employees, locations, value, and/or the like), a location, a market, a technology profile (e.g., including level(s) of usage and/or type(s) of technology being used), and/or the like. Using the historical data and values for the one or more industry parameters as inputs to the industry analysis model, the enterprise management system may identify industry metrics for analysis relative to technology integration to permit the enterprise management system to determine an optimal technology profile for the enterprise and/or facilitate integration of one or more technologies of the technology profile, as described herein. In some implementations, the enterprise management system (and/or another computing system associated with enterprise management system that is assigned to train the industry analysis model) may retrain the industry analysis model by updating the historical data to include validated or unvalidated results associated with input values of the one or more industry parameters.

In this way, the enterprise management system may train the industry analysis model to permit the enterprise management system to analyze received enterprise information associated with a client enterprise, as described herein.

As shown in FIG. 1B, and by reference number 115, the enterprise management system receives enterprise information from the client device. For example, a client enterprise representative (e.g., an information technology representative, a human resources representative, a management/leadership representative, and/or the like), via the client device, may provide the enterprise information in a response to a message (or other communication) that requests the enterprise management system to assess the technology profile of the client enterprise. In some implementations, the enterprise management system may utilize one or more user interfaces and/or messaging interfaces to interact with the client device and/or the client enterprise representative, as described herein. For example, the enterprise management system may utilize a text interface, a voice interface, an instant messaging interface, a chatbot, and/or the like.

The enterprise information may include one or more identifiers associated with the enterprise (e.g., a name of the enterprise, a serial number of the enterprise, an account number of the enterprise, a name or username of the client enterprise representative, and/or the like). Additionally, or alternatively, the enterprise information may include location information associated with the client enterprise, an industry of the client enterprise, and/or the like. The enterprise management system may be configured to provide a service to the client enterprise representative that includes managing the technology of the client enterprise, determining an optimal technology profile for the client enterprise, and/or facilitating integration of new technologies (and/or removal of old technologies) for the client representative. Accordingly, based on receiving such a request or communication from the client enterprise, the enterprise management system may derive (e.g., via an account lookup) the enterprise information based on characteristics of the request (e.g., a source address of the client device, a location of the client device, and/or the like).

In this way, the enterprise management system may receive enterprise information associated with a client enterprise to permit the enterprise management system to determine types of status information that is to be obtained from the client enterprise.

As further shown in FIG. 1B, and by reference number 120, the enterprise management system, via the trained industry analysis model, determine technology metrics based on the enterprise information. For example, the enterprise management system may use the trained industry analysis model to identify certain technology metrics that would likely contribute to a performance (e.g., positively or negatively) of the enterprise. In some implementations, the enterprise management system may determine the technology metrics based on enterprise characteristics that are identified within and/or or determined from the enterprise information (e.g., using one or more processing techniques of the information preprocessor).

In this way, using the trained industry analysis model, the enterprise management system may determine which technology metrics of the enterprise are to be analyzed to determine an optimal technology profile, as described herein.

As further shown in FIG. 1B, and by reference number 125, the enterprise management system, via the trained industry analysis model, may obtain industry specific status queries associated with the technology metrics. For example, the status query data structure may store queries that are mapped to certain technology metrics (e.g., for certain industries). In some implementations, the queries may be obtained and/or associated with queries (e.g., from surveys, questionnaires, polls, and/or the like) used to obtain reference data in the reference data structure.

The enterprise management system may select and/or generate, from the status query data structure, a set of queries that can be used to obtain status information associated with the technology metrics. For example, the set of queries may include specific questions regarding whether the enterprise uses a particular type of technology, how the particular type of technology is used, where the particular type of technology is used, when the particular type of technology is used, who uses (e.g., which departments, representatives, and/or the like) the particular type of technology, how long the particular type of technology has been in use, and/or the like.

In this way, the enterprise management system may obtain industry-specific status queries associated with the most relevant status information from the enterprise relative to determining an optimal technology profile for the enterprise.

As further shown in FIG. 1B, and by reference number 130, the enterprise management system requests status information from the client device. For example, the request may include one or more messages or communications that include the set of queries to cause the client device and/or client enterprise representative to provide the status information.

In some implementations, the enterprise management system may send a response to the client device to prompt the client enterprise representative to provide, via a user input, the status information as answers to the set of queries. More specifically, the set of queries may be provided to the client device as an electronic survey, questionnaire, and/or the like. In some implementations, the enterprise management system may request the status information by providing a link (e.g., a uniform resource locator (URL)) to an interface (e.g., an API) that permits the client enterprise representative to provide the status information.

In some implementations, the client device is configured to store and/or automatically provide the status information based on receiving one or more queries from the enterprise management system. Accordingly, based on receipt of the selected queries from the enterprise management system, the client device may respond to the request with results of the set of queries. For example, for a technology metric that shows positive performance within an industry (e.g., the reference data structure includes entries for successful reference enterprises showing a high usage of the technology), the enterprise management system may select and provide a query associated with indicating a quantity of a particular type of devices associated with that technology metric that are deployed within the client enterprise. In such an example, the client device may be configured to automatically perform of a lookup of the quantity of devices and reply to the enterprise management system with the quantity.

In this way, the enterprise management system may request the status information to permit the enterprise management system to obtain the most relevant information for determining an optimal technology profile.

As further shown in FIG. 1C, and by reference number 135, the enterprise management system generates client data based on received status information from the client device. For example, the status information may be received as a response to the request via a user interface and/or messaging interface of the enterprise management system. The client data may include data and/or information that is extracted from the enterprise information and the status information. For example, the client data may identify enterprise characteristics associated with the client enterprise (e.g., financial data (such as revenue, profit, margin, expenses, cash flow, and/or the like), growth data, location data, industry data, market data, size data, and/or the like) and a technology profile (e.g., data that indicates types of technologies in use, data that indicates a level of usage of the technologies, and/or the like). The technology profile may be generated or obtained from the status information based on values associated with the technology metrics identified by industry analysis model.

In this way, the enterprise management system may generate the client data from the received status information to permit the enterprise management system to assess the client data relative to reference data associated with reference enterprises, as described herein.

As further shown in FIG. 1C, and by reference number 140, the enterprise management system selects, from the reference data structure, reference data associated with the reference enterprises. For example, the enterprise management system may perform a similarity analysis (e.g., using a K-nearest neighbor technique, a cluster analysis technique, and/or the like) to identify reference enterprises that have similar enterprise characteristics as the enterprise characteristics of the client enterprise (e.g., are located in the same area, are a similar size, have similar revenue, and/or the like). The reference enterprises may be identified according to similarity scores determined from a comparison of the client enterprise to individual reference enterprise associated with a same industry as the client enterprise. As described herein, a subset of the reference enterprises may receive a similarity score that satisfies a similarity threshold (e.g., 50% probability that the enterprises are similar, 75% change the enterprises are similar, 90% probability that the enterprises are similar, and/or the like). In such a case, reference data associated with the subset of reference enterprises can be selected to analyze and/or determine an optimal technology profile for the client enterprise (e.g., by determining the technology profiles for the similar reference enterprises that are identified as successful according to the reference data).

In this way, the enterprise management system may select reference data that is most relevant to the client enterprise and that can be used to determine an optimal technology profile for the client enterprise, as described herein.

As further shown in FIG. 1C, and by reference number 145, the matrix generator generates matrices based on the client data and the reference data. For example, matrix generator may use a matrix factorization technique that converts the client data and the reference data to a common format (e.g., with corresponding subsets of the client data and reference data being mapped to the same rows and/or columns of the matrices). As a more specific example, technology metrics may be identified and/or indicated using an identifier (e.g., that corresponds to a technology type) within a particular row and/or column of the matrix and a score (e.g., that corresponds to a level of usage) in another particular row and/or column of the matrix. Accordingly, certain rows and/or columns of the matrices may represent scores that correspond to levels of usage of certain technologies by the client enterprise and/or the reference enterprise.

Accordingly, the matrix generator may generate a client matrix, from the client data, that is based on the technology metrics for the client enterprise and a reference matrix that is based on corresponding technology metrics and corresponding enterprise characteristics of the reference enterprises.

In this way, the enterprise management system may generate a client matrix and a reference matrix to permit the enterprise management system, via the enterprise assessment model, to quickly and effectively compare the client data and the reference data.

As further shown in FIG. 1C, and by reference number 150, the enterprise management system, via the enterprise assessment model, compares the client matrix and the reference matrix. For example, the enterprise management system may use one or more correlation techniques (e.g., a Spearman Correlation or other type of rank/order correlation) to compare the client matrix and the reference matrix, and, correspondingly, the client enterprise to the reference enterprise. In such a case, the enterprise management system may compare corresponding scores for technology metrics within the matrices to identify differences between uses of the various types of technology utilized within the industry.

In some implementations, based on identifying one or more reference enterprises that are successful within the industry (e.g., according to one or more values of the reference matrix), the enterprise assessment model may compare technology metrics for the client enterprise with the one or more reference enterprises, as represented in the client matrix and reference matrix. Accordingly, if the reference matrix indicates that an enterprise using a particular technology, at a certain level, correlates with success within the industry (e.g., especially for a same or similarly-sized enterprise), the enterprise assessment model may determine that an optimal technology profile for the client enterprise should include the same or similar usage of that technology.

In this way, the enterprise management system may compare the client matrix and the reference matrix to determine an optimal technology profile for a client enterprise based on collected reference data associated with a plurality of reference enterprises.

As further shown in FIG. 1C, and by reference number 155, the enterprise management system performs one or more actions associated with the client enterprise. For example, based on a difference between a technology profile of the client enterprise and enterprise technology profiles of successful reference enterprises, the enterprise management system may determine an optimal technology profile that is based on the reference technology profiles and/or the enterprise characteristics of the enterprise (e.g., if one or more of the enterprise characteristics of the client enterprise are determined to be different, according to a similarity score, from one or more of the reference enterprise characteristics).

Based on determining the optimal technology profile for the client enterprise, the enterprise management system may recommend (e.g., via a notification to the client device or a management device of the client enterprise) that usage of a particular technology be increased. For example, the enterprise management system may generate a recommendation associated with a particular technology based on a difference between corresponding scores (or corresponding sets of scores) of the client matrix and the reference matrix (e.g., that the usage of a technology should or should not be adjusted within the client enterprise based on reference levels of usage of the technology by the reference enterprises). Additionally, or alternatively, the enterprise management system may provide the recommendation to the client device.

In some implementations, the enterprise management system may be configured to determine and/or identify information associated with integrating one or more technologies of an optimal technology profile for the client enterprise. For example, the enterprise management system may obtain one or more offers (e.g., offers for sale, rent, and/or the like) associated with a transaction involving usage of a particular technology. In such a case, the enterprise management system may perform a search (e.g., of a database, the Internet, and/or the like) to find available offers and/or information on the technology that would permit the client enterprise to engage in the transaction and/or integrate the technology based on execution of the technology. The enterprise management system may provide the offer and/or information to the client device (or management device) to facilitate the transaction (e.g., via a link to a transaction page and/or a link to a website associated with a provider of the technology).

In some implementations, the enterprise management system may be configured to control the usage of a particular technology. For example, for a cloud computing technology, the enterprise management system may be configured to adjust (e.g., increase or decrease) usage of the cloud computing technology by increasing or decreasing cloud resources that are available to the client enterprise. In this way, the enterprise management system may cause and/or perform a usage transaction (e.g., a transaction to activate or deactivate resources and/or pay for activation or deactivation of resources) associated with a particular technology to increase or decrease usage of the particular technology.

In some implementations, the enterprise management system may update the reference data structure with reference data associated with the determined optimal technology profile of the client enterprise. For example, the enterprise management system may store the enterprise information, the status information, and/or the recommendation in the reference data structure. Additionally, or alternatively, the enterprise management system may use the enterprise information, status information, recommendation, and/or the like to retrain the industry analysis model or one or more other models of the enterprise management system.

Accordingly, as described herein, the enterprise management system may determine an optimal technology profile for a particular enterprise and/or facilitate integration of a technology for the enterprise (e.g., according to the optimal technology profile) according to one or more trends or characteristics of the industry, thereby conserving resources that might otherwise be wasted by an enterprise attempting to determine an optimal technology profile and/or resources that might otherwise be wasted by the enterprise operating without technologies being integrated according to an optimal technology profile that is determined according to one or more of the examples described herein.

As indicated above, FIGS. 1A-1C are provided as an example. Other examples may differ from what is described with regard to FIGS. 1A-1C. The number and arrangement of devices shown in FIGS. 1A-1C are provided as an example. In practice, there may be additional devices, fewer devices, different devices, or differently arranged devices than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) shown in FIGS. 1A-1C may perform one or more functions described as being performed by another set of devices shown in FIGS. 1A-1C.

Figure 2:
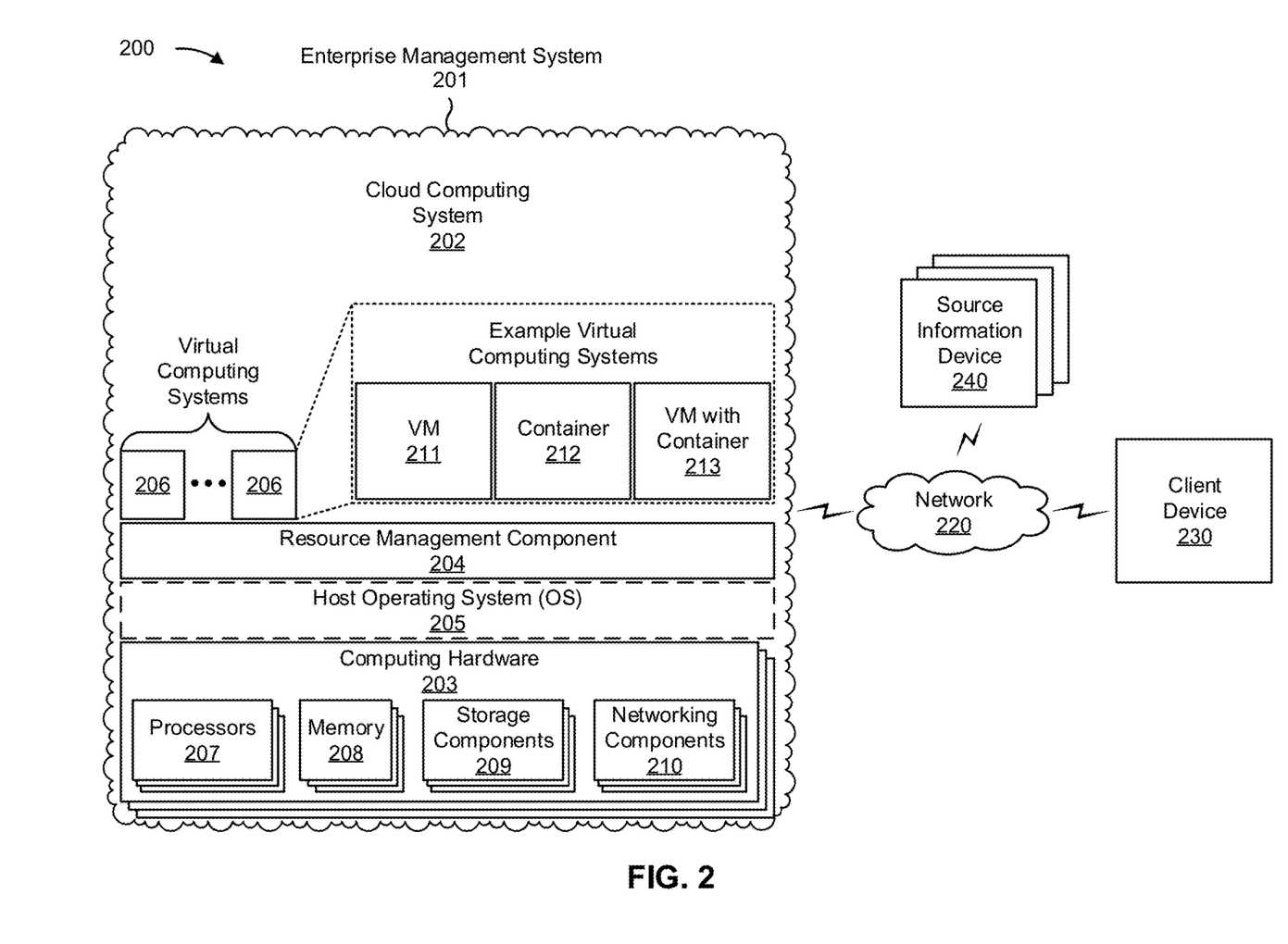
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include an enterprise management system 201, which may include one or more elements of, and/or may execute within, a cloud computing system 202. The cloud computing system 202 may include one or more elements 203-213, as described in more detail below. As further shown in FIG. 2, environment 200 may include a network 220, a client device 230, and/or one or more source information devices 240. Devices and/or elements of environment 200 may interconnect via wired connections and/or wireless connections.

The cloud computing system 202 includes computing hardware 203, a resource management component 204, a host operating system (OS) 205, and/or one or more virtual computing systems 206. The resource management component 204 may perform virtualization (e.g., abstraction) of computing hardware 203 to create the one or more virtual computing systems 206. Using virtualization, the resource management component 204 enables a single computing device (e.g., a computer, a server, and/or the like) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, and/or the like) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, a hybrid environment 213 that includes a virtual machine and a container, and/or the like. A virtual computing system 206 may execute one or more applications using a file system that includes binary files, software libraries, and/or other resources required to execute applications on a guest operating system (e.g., within the virtual computing system 206) or the host operating system 205.

Although the enterprise management system 201 may include one or more elements 203-213 of the cloud computing system 202, may execute within the cloud computing system 202, and/or may be hosted within the cloud computing system 202, in some implementations, the enterprise management system 201 may not be cloud-based (e.g., may be implemented outside of a cloud computing system) or may be partially cloud-based. For example, the enterprise management system 201 may include one or more devices that are not part of the cloud computing system 202, such as device 300 of FIG. 3, which may include a standalone server or another type of computing device. The enterprise management system 201 may perform one or more operations and/or processes described in more detail elsewhere herein.

Network 220 includes one or more wired and/or wireless networks. For example, network 220 may include a cellular network, a public land mobile network (PLMN), a local area network (LAN), a wide area network (WAN), a private network, the Internet, and/or the like, and/or a combination of these or other types of networks. The network 220 enables communication among the devices of environment 200.

The client device 230 includes one or more devices capable of receiving, generating, storing, processing, and/or providing information associated with managing technology of an enterprise, as described elsewhere herein. The client device 230 may include a communication device and/or a computing device. For example, the client device 230 may include a wireless communication device, a user equipment (UE), a mobile phone (e.g., a smart phone or a cell phone, among other examples), a laptop computer, a tablet computer, a handheld computer, a desktop computer, IoT device, or a similar type of device. The client device 230 may communicate with one or more other devices of environment 200, as described elsewhere herein.

The source information device 240 includes one or more devices capable of receiving, generating, storing, processing, and/or providing information associated with technology usage within an industry, as described elsewhere herein. The source information device 240 may correspond to one or more of the industry sources of example 100. The source information device 240 may include a communication device and/or a computing device. For example, the source information device 240 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The source information device 240 may communicate with one or more other devices of environment 200, as described elsewhere herein.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
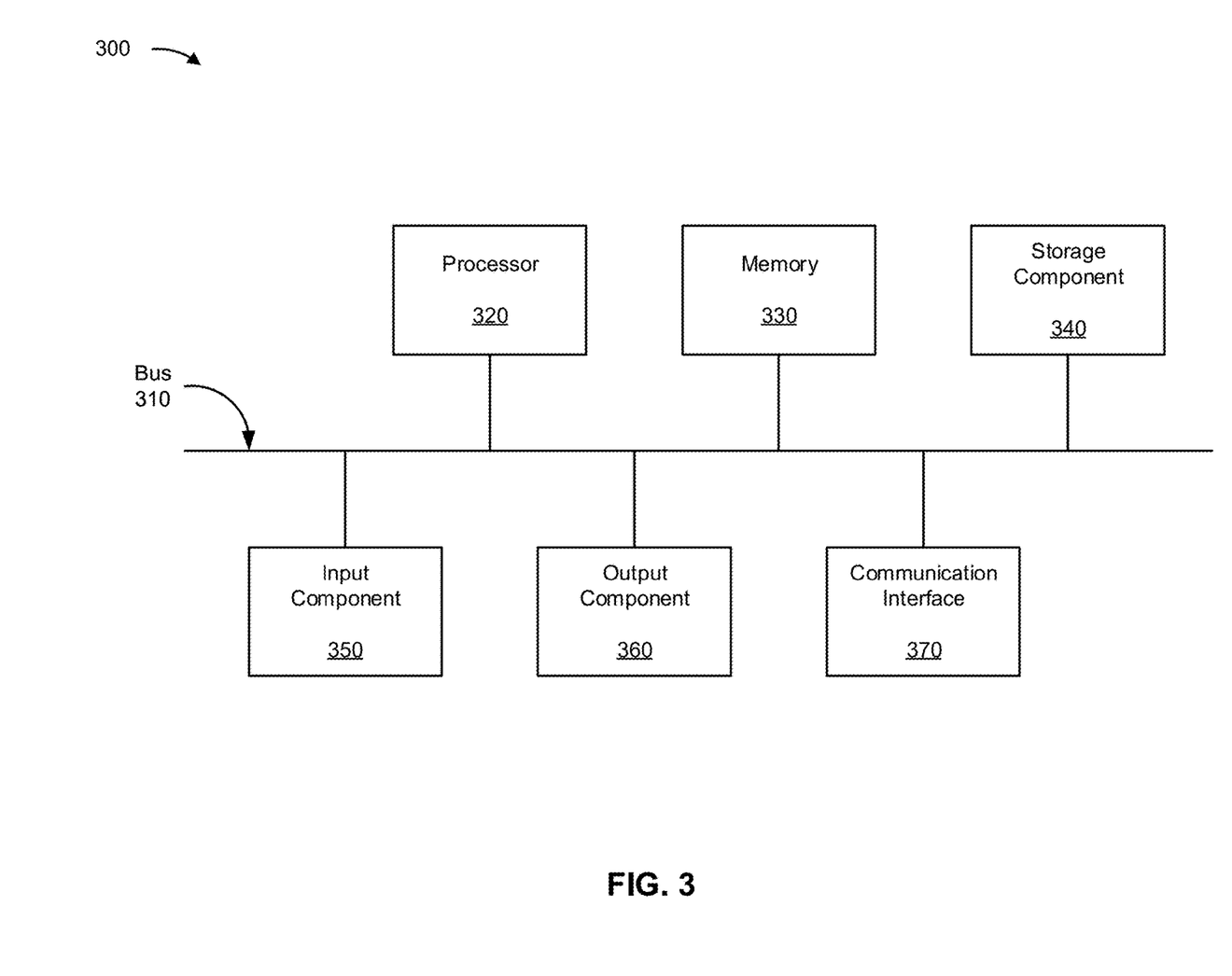
FIG. 3 is a diagram of example components of one or more devices of FIG. 2.

FIG. 3 is a diagram of example components of a device 300, which may correspond to the enterprise management system 201, the client device 230, and/or the source information device 240. In some implementations, the enterprise management system 201, the client device 230, and/or the source information device 240 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, an actuator, and/or the like. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, an antenna, and/or the like.

Device 300 may perform one or more processes described herein. For example, a non-transitory computer-readable medium (e.g., memory 330 and/or storage component 340) may store a set of instructions (e.g., one or more instructions, code, software code, program code, and/or the like) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
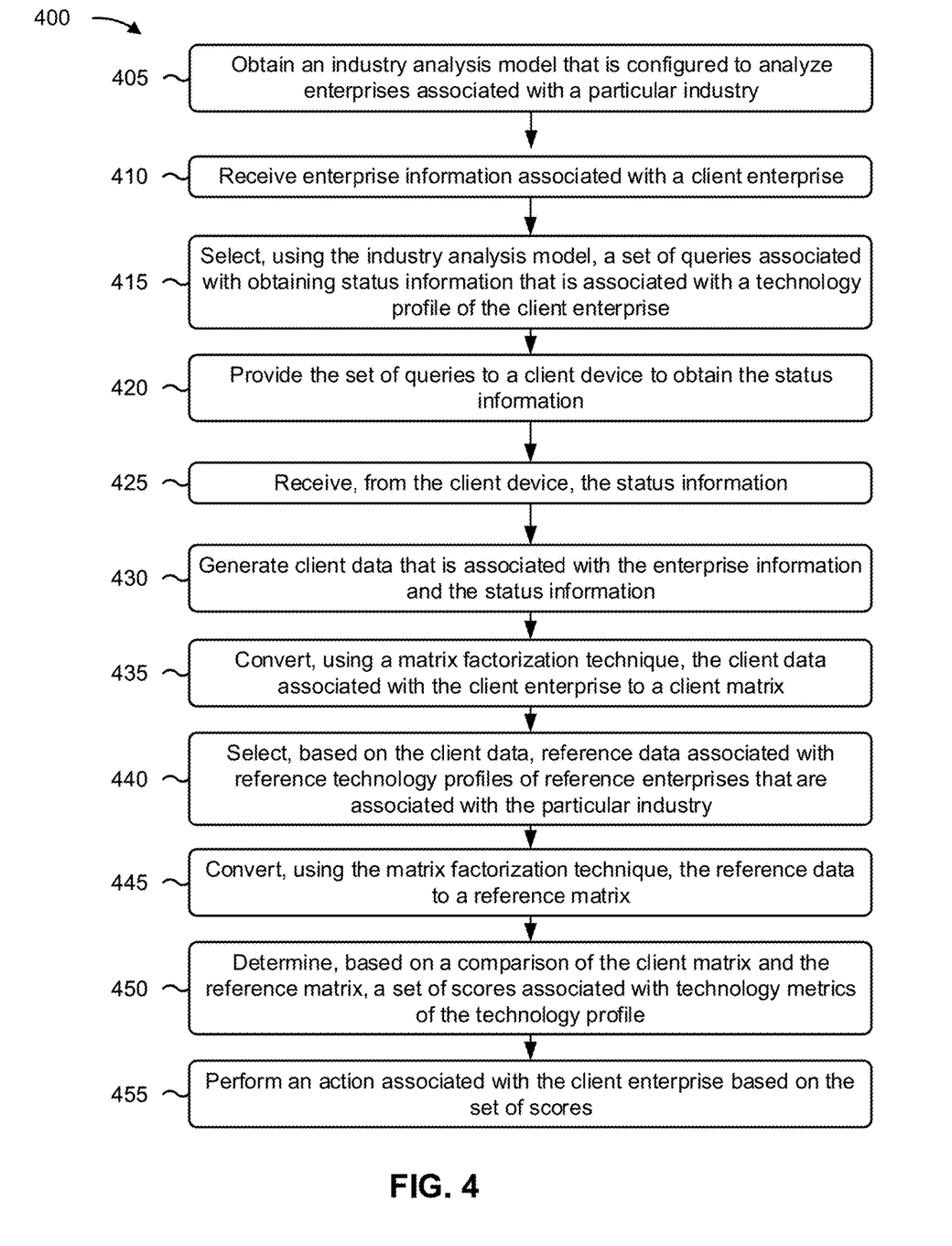
FIG. 4 is a flowchart of an example process relating to analyzing and integrating technology for an enterprise.

FIG. 4 is a flowchart of an example process 400 associated with enterprise management system for technology analysis and integration. In some implementations, one or more process blocks of FIG. 4 may be performed by an enterprise management system (e.g., enterprise management system 201). In some implementations, one or more process blocks of FIG. 4 may be performed by another device or a group of devices separate from or including the enterprise management system, such as a client device (e.g., the client device 230). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include obtaining an industry analysis model that is configured to analyze enterprises associated with a particular industry (block 405). For example, the enterprise management system may obtain an industry analysis model that is configured to analyze enterprises associated with a particular industry, as described above.

As further shown in FIG. 4, process 400 may include receiving enterprise information associated with a client enterprise (block 410). For example, the enterprise management system may receive enterprise information associated with a client enterprise, as described above.

As further shown in FIG. 4, process 400 may include selecting, using the industry analysis model, a set of queries associated with obtaining status information that is associated with a technology profile of the client enterprise (block 415). For example, the enterprise management system may select, using the industry analysis model, a set of queries associated with obtaining status information that is associated with a technology profile of the client enterprise, as described above.

As further shown in FIG. 4, process 400 may include providing the set of queries to a client device to obtain the status information (block 420). For example, the enterprise management system may provide the set of queries to a client device to obtain the status information, as described above.

As further shown in FIG. 4, process 400 may include receiving, from the client device, the status information (block 425). For example, the enterprise management system may receive, from the client device, the status information, as described above.

As further shown in FIG. 4, process 400 may include generating client data that is associated with the enterprise information and the status information (block 430). For example, the enterprise management system may generate client data that is associated with the enterprise information and the status information, as described above.

As further shown in FIG. 4, process 400 may include converting, using a matrix factorization technique, the client data associated with the client enterprise to a client matrix (block 435). For example, the enterprise management system may convert, using a matrix factorization technique, the client data associated with the client enterprise to a client matrix, as described above.

As further shown in FIG. 4, process 400 may include selecting, based on the client data, reference data associated with reference technology profiles of reference enterprises that are associated with the particular industry (block 440). For example, the enterprise management system may select, based on the client data, reference data associated with reference technology profiles of reference enterprises that are associated with the particular industry, as described above.

As further shown in FIG. 4, process 400 may include converting, using the matrix factorization technique, the reference data to a reference matrix (block 445). For example, the enterprise management system may convert, using the matrix factorization technique, the reference data to a reference matrix, as described above.

As further shown in FIG. 4, process 400 may include determining, based on a comparison of the client matrix and the reference matrix, a set of scores associated with technology metrics of the technology profile (block 450). For example, the enterprise management system may determine, based on a comparison of the client matrix and the reference matrix, a set of scores associated with technology metrics of the technology profile, as described above.

As further shown in FIG. 4, process 400 may include performing an action associated with the client enterprise based on the set of scores (block 455). For example, the enterprise management system may perform an action associated with the client enterprise based on the set of scores, as described above.

Process 400 may include additional implementations, such as any single implementation or any combination of implementations described below and/or in connection with one or more other processes described elsewhere herein.

In a first implementation, the industry analysis model is a machine learning model that is trained to identify technology metrics associated with a particular industry based on historical data associated with a plurality of enterprises associated with the particular industry.

In a second implementation, the machine learning model is configured to utilize a natural language processing technique to obtain the historical data from at least one of historical surveys of: one or more of the plurality of enterprises that include one or more of the set of queries, historical articles associated with one or more of the plurality of enterprises that describe types of technologies associated with the technology profile, or historical research documents associated with one or more of the plurality of enterprises that describe the types of technologies associated with the technology profile.

In a third implementation, selecting the reference data comprises determining similarity scores between the enterprise information and reference enterprise information associated with the reference enterprises, determining that the similarity scores satisfy a threshold that indicates that the reference enterprises are similar to the client enterprise, identifying, in a reference data structure, entries in the reference data structure that are associated with the reference enterprises, and selecting the reference data from the entries.

In a fourth implementation, the similarity scores are determined using a K-nearest neighbor classification analysis.

In a fifth implementation, the technology metrics correspond to levels of usage of particular types of technology by the client enterprise, and wherein the set of scores are determined based on the levels of usage of the particular types of technology based on corresponding reference levels of usage of the particular types of technology that identified are in the reference technology profiles.

In a sixth implementation, process 400 includes prior to performing the action, identifying a score of the set of scores that satisfies a threshold, wherein the score of the set scores is associated with a level of usage of a particular technology, and determining, based on the score of the set scores satisfying the threshold, that the level of usage of the particular technology should be increased, wherein the action is performed to cause the client enterprise to automatically increase the level of usage of the particular technology.

In a seventh implementation, performing the action comprises at least one generating a recommendation associated with a particular technology based on the set of scores, providing the recommendation to a management device associated with the client enterprise, obtaining an offer associated with a transaction involving usage of a particular technology based on the set of scores, providing the offer to the management device to facilitate the transaction, causing a usage transaction associated with a particular technology to increase or decrease usage of the particular technology, or storing the enterprise information, the status information, and the recommendation in a reference data structure associated with the industry analysis model.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, etc., depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    obtaining, by a device, an industry analysis model that is configured to analyze enterprises associated with a particular industry;
    receiving, by the device, enterprise information associated with a client enterprise;
    selecting, by the device and using the industry analysis model, a set of queries associated with obtaining status information that is associated with a technology profile of the client enterprise;
    providing, by the device, the set of queries to a client device to obtain the status information;
    receiving, by the device and from the client device, the status information;
    generating, by the device, client data that is associated with the enterprise information and the status information;
    converting, by the device and using a matrix factorization technique, the client data associated with the client enterprise to a client matrix;
    selecting, by the device and based on the client data, reference data associated with reference technology profiles of reference enterprises that are associated with the particular industry;
    converting, by the device and using the matrix factorization technique, the reference data to a reference matrix;
    determining, by the device and based on a comparison of the client matrix and the reference matrix, a set of scores associated with technology metrics of the technology profile; and
    performing, by the device, an action associated with the client enterprise based on the set of scores.

2. The method of claim 1, wherein the industry analysis model is a machine learning model that is trained to identify technology metrics associated with a particular industry based on historical data associated with a plurality of enterprises associated with the particular industry.

3. The method of claim 2, wherein the machine learning model is configured to utilize a natural language processing technique to obtain the historical data from at least one of:
    historical surveys of one or more of the plurality of enterprises that include one or more of the set of queries;
    historical articles associated with one or more of the plurality of enterprises that describe types of technologies associated with the technology profile; or
    historical research documents associated with one or more of the plurality of enterprises that describe the types of technologies associated with the technology profile.

4. The method of claim 1, wherein selecting the reference data comprises:
    determining similarity scores between the enterprise information and reference enterprise information associated with the reference enterprises;
    determining that the similarity scores satisfy a threshold in a comparison of the reference enterprises and characteristics of the client enterprise;
    identifying, in a reference data structure, entries in the reference data structure that are associated with the reference enterprises; and
    selecting the reference data from the entries.

5. The method of claim 4, wherein the similarity scores are determined using a K-nearest neighbor classification analysis.

6. The method of claim 1, wherein the technology metrics correspond to levels of usage of particular types of technology by the client enterprise, and
    wherein the set of scores are determined based on the levels of usage of the particular types of technology based on corresponding reference levels of usage of the particular types of technology that are identified in the reference technology profiles.

7. The method of claim 1, further comprising:
    prior to performing the action, identifying a score of the set of scores that satisfies a threshold,
        wherein the score of the set of scores is associated with a level of usage of a particular technology; and
    determining, based on the score of the set of scores satisfying the threshold, that the level of usage of the particular technology should be increased,
        wherein the action is performed to cause the client enterprise to automatically increase the level of usage of the particular technology.

8. The method of claim 1, wherein performing the action comprises at least one:
    generating a recommendation associated with a particular technology based on the set of scores;
    providing the recommendation to a management device associated with the client enterprise;
    obtaining an offer associated with a transaction involving usage of a particular technology based on the set of scores;
    providing the offer to the management device to facilitate the transaction;
    causing a usage transaction associated with a particular technology to increase or decrease usage of the particular technology; or
    storing the enterprise information, the status information, and the recommendation in a reference data structure associated with the industry analysis model.

9. A device, comprising:
    one or more memories; and
    one or more processors, communicatively coupled to the one or more memories, configured to:

receive enterprise information associated with a client enterprise;

determine, from the enterprise information, enterprise characteristics associated with the client enterprise;

select, based on the enterprise characteristics, a set of queries associated with obtaining status information that is associated with a technology profile of the client enterprise;

provide the set of queries to a client device to obtain the status information;

receive, from the client device, the status information;

generate client data that is associated with the enterprise characteristics and technology metrics identified in the status information;

select, based on the client data, reference data associated with reference technology profiles of reference enterprises that are associated with a particular industry;

generate, from the client data and using a matrix factorization technique, a client matrix that is based on the technology metrics and the enterprise characteristics;

generate, from the reference data and using the matrix factorization technique, a reference matrix that is based on corresponding technology metrics and corresponding enterprise characteristics of the reference enterprises;

determine, based on a comparison of the client matrix and the reference matrix, a recommendation associated with usage of a particular technology of the technology profile; and perform an action associated with the recommendation and the client enterprise.

10. The device of claim 9, wherein the set of queries are selected using a machine learning model that is trained to identify sets of technology metrics associated with one or more key performance indicators of the particular industry based on historical data associated with a plurality of enterprises associated with the particular industry.

11. The device of claim 9, wherein the one or more processors, when selecting the reference data, are configured to:

determine similarity scores between the enterprise characteristics and reference enterprise characteristics associated with the reference enterprises;

determine that the similarity scores satisfy a threshold in a comparison of characteristics of the reference enterprises and characteristics of the client enterprise;

identify, in a reference data structure, entries in the reference data structure that are associated with the reference enterprises; and select the reference data from the entries.

12. The device of claim 11, wherein the enterprise characteristics and reference enterprise characteristics are associated with at least one of:

a financial metric;

a location;

an industry;

a market metric;

a growth metric; or an enterprise size metric.

13. The device of claim 9, wherein the technology metrics correspond to usage levels of particular technologies that are associated with operating the client enterprise.

14. The device of claim 9, wherein the one or more processors are further configured to:

prior to performing the action, identify a score of the set of scores that satisfies a threshold, wherein the score is associated with a level of usage of a particular technology; and determine, based on the score satisfying the threshold, that the level of usage of the particular technology should be increased, wherein the action is performed to cause the client enterprise to automatically increase the level of usage of the particular technology.

15. A non-transitory computer-readable medium storing a set of instructions, the set of instructions comprising:

one or more instructions that, when executed by one or more processors of a device, cause the device to:

collect reference information associated with a plurality of reference enterprises that are associated with a particular industry;

determine, from the reference information, technology metrics associated with the particular industry;

generate, based on the technology metrics, a set of queries associated with obtaining status information for technology metrics of a client enterprise;

provide, to a client device associated with the client enterprise, the set of queries to obtain the status information;

receive, from the client device, the status information and enterprise characteristics associated with the client device;

generate client data that is associated with the enterprise characteristics and the status information;

determine, based on the enterprise characteristics, a set of reference enterprises, from the plurality of reference enterprises, that are similar to the client enterprise;

obtain reference data associated with the set of reference enterprises;

convert, using a matrix factorization, the client data to a client matrix and the reference data to a reference matrix;

determine, based on a comparison of the client matrix and the reference matrix, a set of scores associated with technology metrics of a technology profile; and perform an action associated with the client enterprise based on the set of scores.

16. The non-transitory computer-readable medium of claim 15, wherein the reference information comprises at least one of:

historical surveys of one or more of the plurality of reference enterprises that include one or more of the set of queries;

historical articles associated with one or more of the plurality of reference enterprises that describe types of technologies associated with the technology profile; or historical research documents associated with one or more of the plurality of reference enterprises that describe the types of technologies associated with the technology profile.

17. The non-transitory computer-readable medium of claim 15, wherein the one or more instructions, that cause the device to identify the set of reference enterprises, cause the device to:

determine, using a K-nearest neighbor technique, similarity scores between the enterprise characteristics and reference enterprise characteristics associated with the plurality of reference enterprises; and select the set of reference enterprises from the plurality of reference enterprises based on a set of similarity scores associated with the set of reference enterprises satisfying a similarity threshold.

18. The non-transitory computer-readable medium of claim 15, wherein the technology metrics correspond to levels of usage of particular types of technology by the client enterprise, and
   wherein the set of scores are determined based on the levels of usage of the particular types of technology relative to corresponding reference levels of usage of the particular types of technology by the set of reference enterprises.

19. The non-transitory computer-readable medium of claim 15, wherein the one or more instructions further cause the device to:
   prior to performing the action, identify that a score of the set of scores satisfies a threshold,
      wherein the score is associated with a level of usage of a particular technology; and
   determine, based on the score satisfying the threshold, that the level of usage of the particular technology should be adjusted,
      wherein the action is performed to cause the client enterprise to automatically adjust the level of usage of the particular technology.

20. The non-transitory computer-readable medium of claim 15, wherein the one or more instructions, that cause the device to perform the action, cause the device to at least one:
   generate a recommendation associated with a particular technology based on the set of scores;
   provide the recommendation to a management device associated with the client enterprise;
   obtain an offer associated with a transaction involving usage of a particular technology based on the set of scores;
   provide the offer to the management device to facilitate the transaction;
   cause a usage transaction associated with a particular technology to increase or decrease usage of the particular technology; or
   store the enterprise characteristics, the status information, and the recommendation in a reference data structure associated with the reference information.

* * * * *